C. SINTZ.
COOLING TANK.
APPLICATION FILED AUG. 14, 1912.

1,107,455. Patented Aug. 18, 1914.

Witnesses
Harold O. Van Antwerp
Pearl Cary

Inventor
Claude Sintz.
By Luther V. Moulton
Attorney

UNITED STATES PATENT OFFICE.

CLAUDE SINTZ, OF DETROIT, MICHIGAN.

COOLING-TANK.

1,107,455.　　　　Specification of Letters Patent.　　Patented Aug. 18, 1914.

Application filed August 14, 1912. Serial No. 715,063.

*To all whom it may concern:*

Be it known that I, CLAUDE SINTZ, a citizen of the United States of America, residing at Detroit, in the county of Wayne and State of Michigan, have invented certain new and useful Improvements in Cooling-Tanks; and I do hereby declare the following to be a full, clear, and exact description of the invention, such as will enable others skilled in the art to which it appertains to make and use the same.

My invention relates to improvements in cooling tanks and more particularly to such devices used in connection with motor driven vehicles, and its object is to provide a device that can be readily taken apart for cleaning or repairs; to provide the same with means for separating sediment from the water therein, and to provide the same with various new and useful features as hereinafter more fully described and particularly pointed out in the claims.

Figure 1:
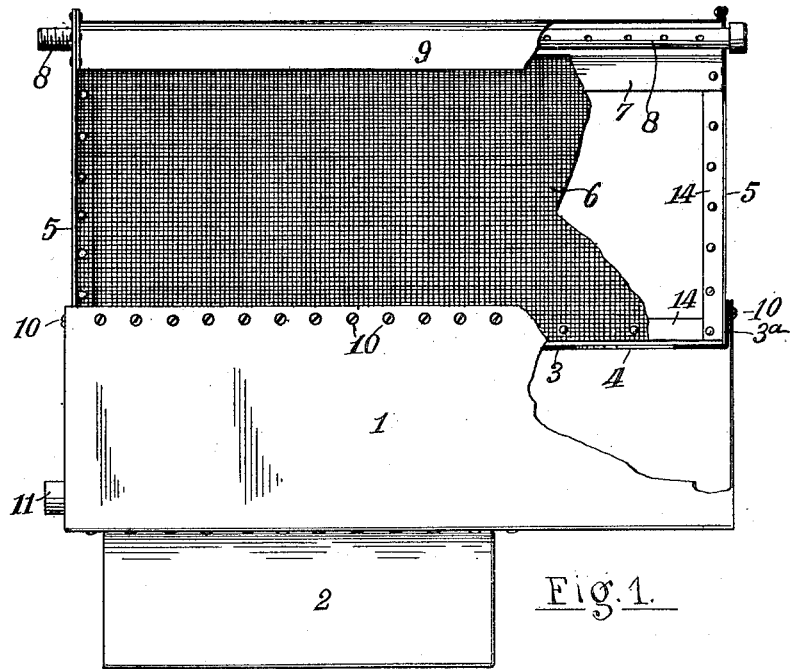
Figures 2, 3:
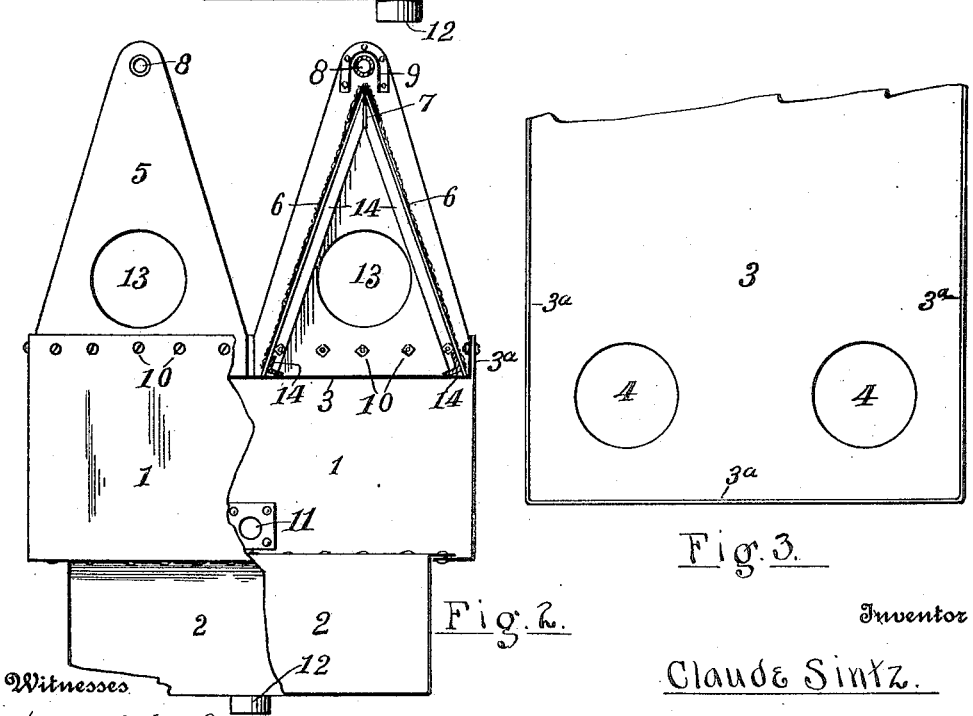

My invention consists essentially of a tank or vessel to receive the water, a settling chamber at the bottom of the same to separate out sediment from the water. Inclined screens above the tank, means for supplying a spray of water to the upper part of the screens, means for collecting the water and directing the same from the screens into the tank, means for circulating air through the screens, as will more fully appear by reference to the accompanying drawings in which:

Figure 1 is a side elevation of a device embodying my invention, with portions broken away to show the construction. Fig. 2 an end elevation of the same with portions broken away showing a partial transverse section. Fig. 3 a plan view of a portion of the receiving tray below the screens.

Like numbers refer to like parts in all of the figures.

1 represents the receiving tank through which the water circulates, preferably rectangular in form, and of any convenient dimensions, 2 is a settling chamber below this tank to remove the sediment, through which chamber the water does not circulate, 3 is a receiving tray in the top of the tank and fitted closely within the same by providing an upwardly turned flange 3ª secured to the upper edges of the tank by removable bolts 10. Near each corner of the tray is an opening 4 in the bottom of the same to permit the water accumulated therein to pass to the tank 1, this tray serves also to prevent the water from splashing out over the sides of the tank, due to the motion of the vehicle.

At each end of the tank is a triangular head 5, and I prefer to make the parts above the tank in duplicate as illustrated in the drawings. Each head 5 is provided with a large opening 13 to admit of circulation of air and to the inclined edges of these heads are attached wire screens 6, which are joined at the upper edges thus forming oppositely inclined foraminous walls down which the water flows being thus minutely subdivided and exposed to the air. I prefer to use angle bars 14 to connect the screens to the heads and also to support the lower edges of the screens in proper alinement within the tray 3, into which tray the water escapes from the screen. To supply water to the upper edge or apex of the screens, a pipe is provided perforated horizontally at intervals at opposite sides to permit water to escape horizontally therefrom in small jets. The opposing horizontal perforations are of equal area to insure an even distribution of water from both sides of the pipe and to the respective screens below.

A hood 9 serves to connect the upper angles of the heads and is of an inverted U shape in cross section and embracing the pipe and spaced apart therefrom against which hood the water is projecting from said openings in the pipe and thence discharged in a finely subdivided spray upon the upper part of the described screens.

The water accumulated in the tank 1 is carried from thence by any suitable hose attached to a nipple 11 near the bottom of the tank and after circulating through the engine, or otherwise, is returned to the pipe 8 by a suitable tube not shown. Any sediment that may settle in the chamber 2 can be drawn off at the bottom by a pipe attached to the nipple 12 in the bottom of the said chamber.

What I claim is:

1. A cooler, comprising heads having openings, downwardly diverging inclined screens joined at the top and attached to the heads, a pipe above the apex of the screens having horizontal perforations equal in area at opposite sides, and a hood extending opposite the openings in the pipe and spaced apart therefrom to divert the fluid downward upon the screens.

2. A cooler, comprising a fluid receiving tank, heads spaced apart above the tank and having openings to permit the passage of air, downwardly diverging screens joined at the top and extending between the heads, a pipe supported at its respective ends by the heads and extending above and parallel with the apex of the screens and having horizontal openings on opposite sides, and a hood supported at its respective ends by the heads and embracing the pipe to divert the flow of water therefrom to the screens.

In testimony whereof I affix my signature in presence of two witnesses.

CLAUDE SINTZ.

Witnesses:
HAROLD O. VAN ANTWERP,
LUTHER V. MOULTON.

Copies of this patent may be obtained for five cents each, by addressing the "Commissioner of Patents, Washington, D. C."